United States Patent [19]

Wilcox

[11] Patent Number: 5,707,172
[45] Date of Patent: Jan. 13, 1998

[54] FLOATING WAVE ATTENUATORS

[75] Inventor: Paul E. Wilcox, Kirkland, Wash.

[73] Assignee: Waterfront Construction, Inc., Kirkland, Wash.

[21] Appl. No.: 492,772

[22] Filed: Jun. 21, 1995

[51] Int. Cl.$^6$ ............................................. E02B 3/04
[52] U.S. Cl. ............................................. 405/26
[58] Field of Search ........................ 405/26, 27, 28, 405/63, 66, 67

[56] References Cited

U.S. PATENT DOCUMENTS

| | | | |
|---|---|---|---|
| 2,185,458 | 1/1940 | Giliasso | 405/26 |
| 3,487,645 | 1/1970 | Frankel | 405/26 |
| 4,136,994 | 1/1979 | Fuller | 405/63 X |
| 4,146,344 | 3/1979 | Steen et al. | 405/63 X |
| 4,715,744 | 12/1987 | Richey | 405/28 X |

FOREIGN PATENT DOCUMENTS 61-211409  9/1986  Japan ........................... 405/28

*Primary Examiner*—Tamara L. Graysay
*Assistant Examiner*—Tara L. Mayo
*Attorney, Agent, or Firm*—Seed and Berry LLP

[57] ABSTRACT

A floating wave attenuator constructed to float and provide a breakwater to attenuate waves or the like. The wave attenuator includes an elongated pipe closed at its ends and attached to large, heavy deflector plates that extend downwardly and connect at their bottom ends to form a V-shaped configuration. The deflector plates are open on their ends to allow water therebetween to act as ballast and assist in retarding up and down movement of the wave attenuator in response to wave action. A deck structure is mounted to the top of the closed pipe to provide a walkway over the wave attenuator.

6 Claims, 1 Drawing Sheet

FLOATING WAVE ATTENUATORS

TECHNICAL FIELD

The present invention relates to floating wave attenuators, sometimes referred to as floating breakwaters which are anchored in position and are free to move up and down responsive to wave and tide action.

BACKGROUND OF THE INVENTION

Stationary breakwaters created, for example, by rock fill, or plank-connected pilings, are not only expensive, but may be ecologically damaging. Wave attenuators taking the form of logs or of wood or concrete floats have been used in an effort to protect boat moorages, but these are commonly only marginally effective in adequately breaking up wave action. Accordingly, there has been a need for a different approach to this technology.

SUMMARY OF THE INVENTION

The basic concept behind the present invention is to suspend large heavy deflector plates ("keel plates") either steel or concrete, from opposite longitudinal sides of a structural float,-and connect the plates at their bottom to form a V in cross-section. Preferably the float comprises a long pipe closed at its ends which may be surmounted by a deck to provide a walkway.

The float and suspended plates are made long enough so that even though the V formed by the plates is open, the water between the plates is trapped sufficiently to act as ballast and assist in retarding up and down movement of the wave attenuator responsive to wave action. In other words, the mass of the float and keel plates, is supplemented by the trapped water to dampen wave action. Furthermore, the slope of the keel plates deflects the impacting waves downward so that each wave is more likely to undergo its normal rolling cycle rather than having much of its energy exerted in the form of a horizontal force component directed against the breakwater.

DETAILED DESCRIPTION OF THE INVENTION

Figure 1:
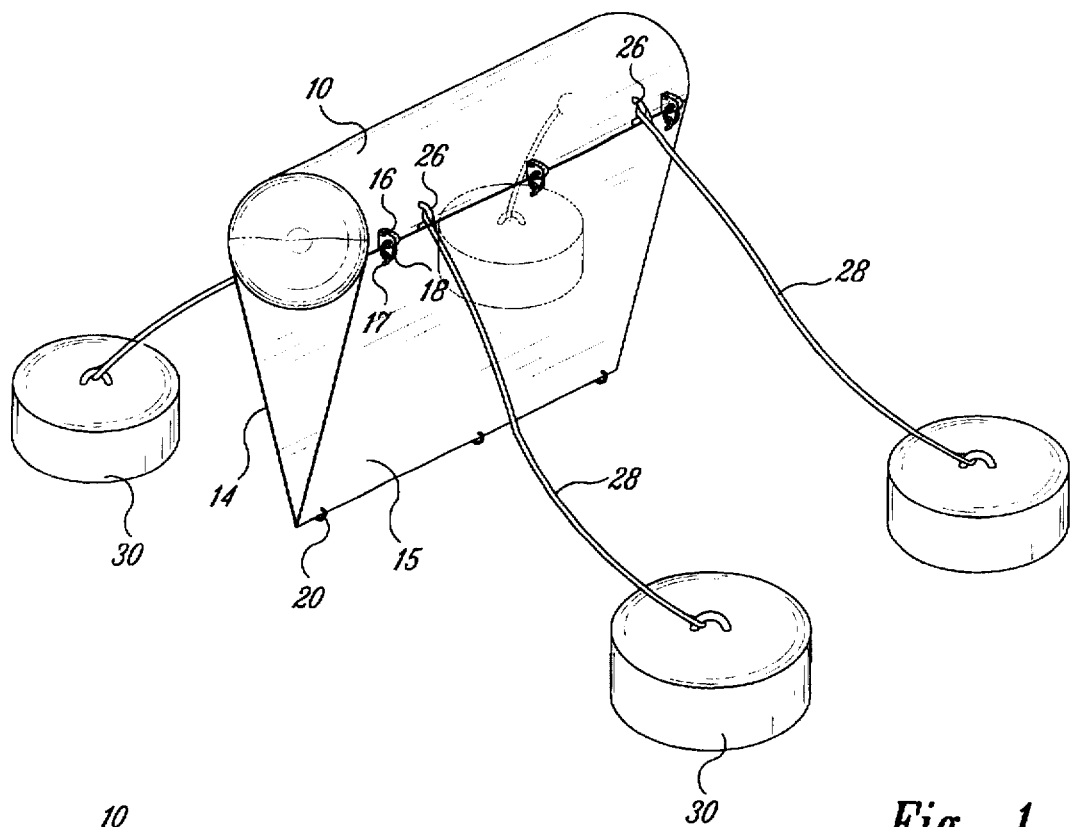
FIG. 1 is an isometric view of a wave attenuator embodying the present invention.

Referring to the drawings a float in the form of an elongated pipe 10, preferably of steel, is provided having its ends closed by end plates 12. Suspended from the pipe 10 are two keel plates 14–15 which converge in the downward direction from connections to opposite sides of the pipe 10. The keel plates preferably are connected together adjacent their lower ends. The result is a structure comprising a float have a generally V-shaped keel which is open at its ends and, is always substantially filled with water to add to the mass of the structure to resist movement responsive to wave action.

Figure 2:
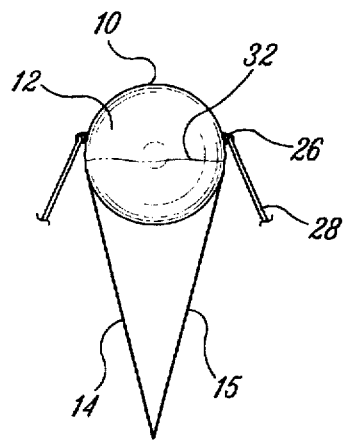
FIG. 2 is an end view of a modified construction.

The connections between the keel plates 14–15 and the pipe float 10 and with one another can take the form of shackles (FIG. 1) or welds (FIG. 2). When shackle connections are used, the pipe float and upper end portions of the keel plates are provided with sets of weld-connected eyes 16, 17 which are connected together by rings 18. Adjacent their lower ends the keel plates are formed with registering holes receiving tie rings 20. When welding is used rather than shackles, welds connect the keel plates 14–15 in tangential relationship to the pipe 10, and welds connect the lower ends of the keel plates together.

Figure 3:
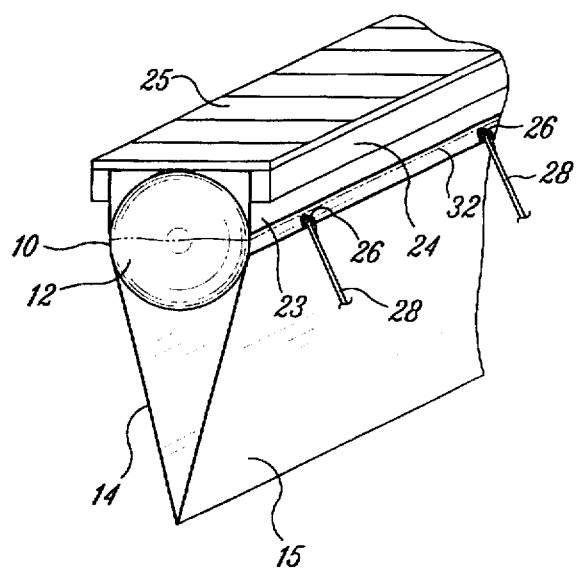
FIG. 3 is a fragmentary perspective view showing a wave attenuator with an optional walkway.

As indicated in FIG. 3, in some instances it is preferred to provide the float with a walkway. This may be accomplished, for example, by welding upwardly projecting straps 23 to the pipe 10 at regular intervals and bolting longitudinal stringers 24 to the straps so that the upper edges of the stringers are at the level of the top of the pipe. Deck 25 is then connected as by screws to the stringers.

For anchoring the wave attenuator, the pipe 10 is provided with eyes 26 for receiving anchor cables 28 or chains extending to bottom anchors 30 (FIG. 1) suitably located. The pipe 10 may be internally subdivided by transverse walls into flotation cells. Multiples of the wave attenuators may be suitably connected end on end to achieve the desired total length. Also, a second wave attenuator may be anchored inshore a few feet from the first.

With the described arrangement the buoyancy of the wave attenuator is provided by the closed pipe 10 which sinks below the water surface to a depth such that the weight of the water displaced by the pipe equals the combined weight of the pipe and keel plates 14–15 plus that of the walkway if provided. It is preferred that the water line 32 be approximately at the level of the center axis of the pipe and that the keel plates depend below the pipe to a depth approximately 1.5 to 2.0 times the pipe diameter. The pipe diameter may range for example, from about three feet to eight feet or more. Steel pipe with a diameter of eight feet and a thickness of 0.75 inches is normally readily available and is relatively inexpensive. The pipe and keel plates are preferred to have a thickness in the range of about 0.25 to 1.0 inches.

The following formula applies when the pipe is half submerged:

$$\pi d t k + 2 w t' k' = \frac{\pi d^2}{8}$$

t=thickness of pipe
t'=thickness of keel plates
d=diameter of pipe
w=width of keel plates
k=specific weight of pipe relative to water
k'=specific weight of keel plates relative to water If the pipe and keel plates are both steel having a specific weight equal to 7.8, the formula becomes:

$$7.8(\pi d t + 2 w t') = \frac{\pi d^2}{8}$$

If the pipe and keel plates are also of the same thickness ("t") the formula becomes:

$$7.8 t(\pi d + 2w) = \frac{\pi d^2}{8}$$

If, for example, w is then selected to be equal to 1.5 d, the formula is further simplified to be:

d=122 t

If w is equal to 2 d, then:

d=142 t

In the first test of the wave attenuator the pipe and keel plates had the following dimensions in inches:

t=0.375 d=40
t'=0.25 w=72

In this instance the pipe was submerged to a depth about one-half inch above the center axis of the pipe. If the keel plates had been 5 inches narrower the pipe would have been submerged substantially to the level of the center axis.

Although the ballast water in the chamber between the keel plates 14–15 is exposed to the surrounding water by way of the open ends of the space between the keel plates, and in the instance of the FIG. 1 embodiment, also by way of the gaps between the upper edges of the keel plates and the pipe 10 and between the lower edges of the keel plates, the ballast water is sufficiently trapped to significantly contribute to stabilization of the wave attenuator. As previously indicated the converging downward slope of the keel plates favorably deflects the waves.

Although it is preferred that the wave attenuator be fabricated from steel, reinforced concrete may be used, for example. In the case of steel, it is preferred to at least provide the pipe with a protective coating of corrosion resistant material such as a suitable epoxy. When the wave attenuator is used to protect a boat moorage it will normally be anchored in waters 20 to 30 feet in depth depending on the tidal range if in salt water.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A floating wave attenuator comprising:

an elongated float comprising a round pipe closed at its ends;

a tapered keel with negative buoyancy, said keel having stiff longitudinal side plates which are connected to said pipe at opposite sides of the pipe and converge downwardly from the float to bottom connections with one another whereby a water-filled chamber is provided beneath the float between said side plates when the wave attenuator is in operating position in a body of water;

said keel and chamber extending a major part of the length of the float, and said float having sufficient positive buoyancy that said float is normally partially exposed above the surface of the body of water in which the wave attenuator is located;

said pipe and keel having a combined weight approximately equal to the weight of water needed to fill one-half the volume enclosed by the pipe.

2. A floating wave attenuator according to claim 1 in which a flat deck is mounted on said pipe.

3. A floating wave attenuator comprising:

a steel tubular float closed at its ends; and two steel keel plates downwardly converging from respective shackle connections to said float at opposite sides of the float, and shackled together below the float.

4. A floating wave attenuator according to claim 3 in which said float and keel plates have a thickness in the range of about 0.25 to 1.0 inches.

5. A floating wave attenuator according to claim 3 in which the combined weight of said float and keel plates is such that said float is about half submerged when the wave attenuator is floating.

6. A floating wave attenuator comprising:

a tubular float with a positive buoyancy closed at its ends;

two keel plates with a negative buoyancy downwardly converging from respective connections to said float at opposite sides of the float, and joined together below the float;

stringers connected to said float along opposite sides of the float;

and decking mounted on said stringers.

* * * * *